United States Patent
Richardson

(10) Patent No.: US 9,551,185 B2
(45) Date of Patent: *Jan. 24, 2017

(54) TOP DRIVE

(71) Applicant: Warrior Rig Ltd., Calgary (CA)

(72) Inventor: Allan Stewart Richardson, The Woodlands, TX (US)

(73) Assignee: Warrior Energy Technologies Limited, Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,795

(22) Filed: Mar. 27, 2015

(65) Prior Publication Data

US 2015/0204141 A1 Jul. 23, 2015

Related U.S. Application Data

(63) Continuation of application No. 13/650,045, filed on Oct. 11, 2012, now Pat. No. 9,017,194.

(60) Provisional application No. 61/545,934, filed on Oct. 11, 2011.

(51) Int. Cl.
| | |
|---|---|
| *F16H 7/00* | (2006.01) |
| *E21B 3/02* | (2006.01) |
| *F16H 7/02* | (2006.01) |
| *F16H 37/06* | (2006.01) |

(52) U.S. Cl.
CPC . *E21B 3/02* (2013.01); *F16H 7/02* (2013.01); *F16H 37/065* (2013.01)

(58) Field of Classification Search
CPC .............. F16H 7/06; F16H 55/36; F16H 7/02; F16H 55/44; A01C 3/06
USPC ........................ 474/84, 85, 86, 139
See application file for complete search history.

(56) References Cited

U.S. PATENT DOCUMENTS

| | | | | |
|---|---|---|---|---|
| 298,291 A | * | 5/1884 | Cromie ...................... | 474/136 |
| 493,859 A | * | 3/1893 | Evans ...................... | A01C 3/06 |
| | | | | 474/121 |
| 500,579 A | * | 7/1893 | Ide ........................... | A01C 3/06 |
| | | | | 474/121 |
| 555,924 A | * | 3/1896 | Brigel ..................... | F16H 55/44 |
| | | | | 474/174 |
| 803,556 A | * | 11/1905 | Charter ..................... | F16H 7/06 |
| | | | | 474/139 |
| 1,234,685 A | * | 7/1917 | Nielsen et al. ........... | F01L 1/02 |
| | | | | 474/150 |
| 1,280,375 A | * | 10/1918 | Bergman ..................... | 451/328 |
| 1,385,396 A | * | 7/1921 | Rayburn ................. | F16H 55/38 |
| | | | | 109/9 |

(Continued)

*Primary Examiner* — Henry Liu
(74) *Attorney, Agent, or Firm* — Oyen Wiggs Green & Mutala LLP

(57) ABSTRACT

A distributed drive includes a frame, a main sprocket, and a plurality of drive assemblies mounted therearound for rotation of the main sprocket. The main sprocket has a circumferential drive rim around which the drive assemblies are mounted in driving engagement with the drive rim so as to selectively rotate the main sprocket relative to the frame. Each drive assembly includes at least two auxiliary sprockets lying substantially in the plane of the main sprocket. An endless belt is mounted around the auxiliary sprockets so that a span of the endless belt spans between a pair of the auxiliary sprockets in an arc-of-contact with the drive rim. At least one of the two auxiliary sprockets is a selectively driven drive sprocket for selective rotation of the main sprocket.

15 Claims, 14 Drawing Sheets

(56) References Cited

U.S. PATENT DOCUMENTS

| | | | | |
|---|---|---|---|---|
| 1,394,328 A * | 10/1921 | Miller | .................... | B60B 19/14 |
| | | | | 152/56 |
| 1,423,028 A * | 7/1922 | Roth | .................... | F16H 7/06 |
| | | | | 474/139 |
| 1,953,060 A * | 4/1934 | Berry | .................... | D21F 1/46 |
| | | | | 162/314 |
| 2,057,435 A * | 10/1936 | Kimble | .................... | F16H 55/36 |
| | | | | 188/264 R |
| 2,090,423 A * | 8/1937 | Morrell | .................... | F16H 7/02 |
| | | | | 19/98 |
| 2,509,054 A * | 5/1950 | Davis | .................... | G11B 19/265 |
| | | | | 369/267 |
| 2,624,205 A * | 1/1953 | Ellstrom | .................... | B27B 3/16 |
| | | | | 144/246.1 |
| 2,664,758 A * | 1/1954 | Smits | .................... | G11B 19/20 |
| | | | | 112/220 |
| 2,696,678 A * | 12/1954 | Deck | .................... | D06C 15/06 |
| | | | | 34/118 |
| 2,707,402 A * | 5/1955 | Blair | .................... | F16H 55/36 |
| | | | | 474/93 |
| 2,753,812 A * | 7/1956 | Wharton | .................... | B61D 43/00 |
| | | | | 105/105 |
| 2,775,131 A * | 12/1956 | Smits | .................... | G11B 19/27 |
| | | | | 474/113 |
| 2,793,920 A * | 5/1957 | Haaff | .................... | F16C 13/04 |
| | | | | 384/549 |
| 3,325,026 A * | 6/1967 | Benedick | .................... | B23K 37/0538 |
| | | | | 414/433 |
| 3,802,287 A * | 4/1974 | Graham | .................... | F16H 55/30 |
| | | | | 474/148 |
| 3,826,306 A * | 7/1974 | Marsh | .................... | F16H 57/0415 |
| | | | | 165/47 |
| 3,863,513 A * | 2/1975 | Schnettler | .................... | F16H 7/02 |
| | | | | 226/172 |
| 3,943,785 A * | 3/1976 | Percifield | .................... | A01D 34/6806 |
| | | | | 474/171 |
| 3,994,350 A * | 11/1976 | Smith | .................... | E21B 19/20 |
| | | | | 173/147 |
| 4,509,933 A * | 4/1985 | Miranti | .................... | F16H 55/36 |
| | | | | 474/188 |
| 4,531,928 A * | 7/1985 | Ikenoya | .................... | B62M 9/06 |
| | | | | 180/229 |
| 4,838,841 A * | 6/1989 | Harvey | .................... | F16C 19/54 |
| | | | | 384/571 |
| 5,049,115 A * | 9/1991 | Kunkel | .................... | F16H 55/36 |
| | | | | 474/166 |
| 5,470,281 A * | 11/1995 | Sinclair | .................... | B62M 6/75 |
| | | | | 474/139 |
| 6,086,494 A * | 7/2000 | Crosta | .................... | D06C 11/00 |
| | | | | 474/139 |
| 6,719,275 B1 * | 4/2004 | Waterson | .................... | B63G 8/39 |
| | | | | 226/171 |
| 6,860,182 B2 * | 3/2005 | Mathias | .................... | B27B 13/10 |
| | | | | 83/169 |
| 2005/0255951 A1 | 11/2005 | Greenwood | | |
| 2006/0058137 A1 * | 3/2006 | Matsuura | .................... | B23D 47/123 |
| | | | | 474/139 |
| 2006/0276283 A1 * | 12/2006 | Thysell | .................... | B24B 7/186 |
| | | | | 474/85 |
| 2007/0015617 A1 * | 1/2007 | Bertolotti | .................... | F03D 1/0658 |
| | | | | 474/85 |
| 2007/0267222 A1 * | 11/2007 | Howard, Jr. | .................... | H02K 1/16 |
| | | | | 175/122 |
| 2009/0075767 A1 * | 3/2009 | Thysell | .................... | B24B 7/186 |
| | | | | 474/85 |
| 2009/0183923 A1 * | 7/2009 | Williams | .................... | H02K 1/16 |
| | | | | 175/122 |
| 2011/0124451 A1 * | 5/2011 | Alexander | .................... | F02G 5/04 |
| | | | | 474/139 |

* cited by examiner

TOP DRIVE

FIELD OF THE INVENTION

This invention relates to the field of electric top drives and in particular an improved and modular electric top drive and its associated distributed drive wherein a plurality of electric motors are modularly mounted spaced apart around the outer perimeter of the top drive and wherein each motor contributes to rotation of the top drive quill main shaft by separate independently actuated belted transmissions, each distributed around the top drive to correspond to each of the plurality of electric motors.

BACKGROUND OF THE INVENTION

Top Drives have been commonly used on drilling rigs, since the 1980's offshore and since the 1990's on land. Despite numerous refinements over the years, these machines have a sub-optimal reliability record, as affected by the following considerations:
1. The top drive represents a single-point failure on a drilling rig. There is no inherent back-up capability.
2. The drilling rig environment affords poor access for preventative maintenance. Most of the time, the top drive is either moving or at high elevation or both.
3. The machines have sufficient complexity to disqualify or deter wellsite personnel from many service functions.
4. Sub-systems on the top drives typically lack redundancy.
5. Some typical sub-systems, especially hydraulic rotary unions, remain prone to failure, despite years of refinements.
6. Some sub-systems, especially service loops, are inevitably susceptible to external damage in the drilling rig environment.
7. Repair of some major sub-systems, especially gear reduction drives, requires substantial machine disassembly and specialized technicians. A gear reduction repair typically requires at least 24 hours plus mobilization time for a technician and parts (many days in remote locations).
8. Gear reduction drives are also dependent on the proper operation of lubrication circulation systems which typically have significant complexity, numerous failure modes, periodic maintenance requirements and no redundancy.

To improve top drive reliability, it is desirable to improve the simplicity, redundancy and serviceability of the top drive sub-systems, including:
1. Better facilitate preventative maintenance by wellsite personnel.
2. Improve diagnostic tools for wellsite personnel.
3. Include full or partial redundancy of sub-systems.
4. Modular sub-systems for ease of replacement.
5. Sub-systems externally serviceable/repairable, not buried in the machine.
6. Sub-systems understandable & serviceable by rig personnel.
7. Eliminate critical sub-systems such as lubrication circulation.

Overhead oil leakage from top drives is often a significant problem on drilling rigs because of occupational, environmental & safety reasons and the necessary time and cost of diagnosis and repair of oil leaks. Elimination of oil lubrication systems required for gear reduction drives would entirely avoid a primary source of oil leakage.

SUMMARY OF THE INVENTION

For use in a top drive, the distributed drive according to one aspect of the present invention may be characterized as including a frame, a main sprocket, and a plurality of drive assemblies mounted therearound. The main sprocket is rotatably mounted within the frame for rotation of the sprocket about a main axis of rotation which is concentric with the axis of the main shaft of the top drive. Thus the main sprocket lies in a plane which is substantially orthogonal to the main axis of rotation. The main sprocket has a circumferential drive rim having a corresponding drive rim pitch circle therearound. The plurality of drive assemblies are mounted distributed around the drive rim and cooperate in driving engagement with the drive rim so as to selectively rotate the main sprocket relative to the frame about the main axis of rotation.

Each drive assembly includes at least two auxiliary sprockets having corresponding auxiliary sprocket pitch circles and lying substantially in the plane of the main sprocket. An endless belt is also mounted substantially in the plane of the main sprocket, snugly mounted around the auxiliary sprockets so that a span of the endless belt spans between a pair of the auxiliary sprockets.

The pair of auxiliary sprockets are spaced apart in the plane of the main sprocket and are spaced apart around and adjacent to the drive rim so as to engage the span of the endless belt in an arc-of-contact with the drive rim. At least one of the two auxiliary sprockets is a selectively driven drive sprocket for selective rotation of the main sprocket.

In one embodiment the span of the endless belt extends from and between a corresponding pair of tangents on the pitch circles of the pair of auxiliary sprockets, wherein the pitch circles of the pair of tangents are adjacent the pitch circle of the drive rim. The pair of auxiliary sprockets are sufficiently spaced apart around the drive rim so that a line intersecting the pair of tangents on the pair of auxiliary sprockets forms a cord across the pitch circle of the main sprocket.

In a preferred embodiment the distributed drive provides a power transmission for a top drive. Advantageously the endless belt is a dry-run belt, whereby lubrication of the distributed drive is minimized. The endless belt may be described as having an endless exterior surface which contacts the drive rim and an endless interior surface opposite to the exterior surface, and wherein in one embodiment the exterior surface is a toothed surface, which is not intended to be limiting. The interior surface of the belt may also be a toothed surface, which again is not intended to be limiting.

In a preferred embodiment the at least two auxiliary sprockets includes at least one auxiliary sprocket mounted between the pair of auxiliary sprockets so as to engage the exterior surface of the belt along a portion of the belt opposite to the span of the endless belt. In one embodiment thereof the auxiliary sprocket or one of the auxiliary sprockets which is or are mounted between the pair of auxiliary sprockets is the drive sprocket and the toothed exterior surface of the belt engages the drive rim and the drive sprocket so that the portion of the belt opposite the span is a driven portion of the belt. The driven portion of the belt thus has a second arc-of-contact around the drive sprocket.

Advantageously the drive sprocket is nested between the pair of auxiliary sprockets so that the second arc-of-contact of the driven portion of the belt extends around an arc and length of contact sufficient for a particular belt on a particular sprocket given the characteristics of both to avoid slippage or tooth breakage as the case may be, for example approximately one quarter to one half of the way around the drive sprocket. The belt thus forms a serpentine shape along the driven portion of the belt. In this embodiment the pair of auxiliary sprockets may be idler sprockets.

One idler sprocket may include an eccentric tensioner. The eccentric tensioner may include a pivot about which the idler sprocket rotates in the plane of the main sprocket. The pivot may be located on a side of the idler sprocket closest to the main sprocket.

In one preferred embodiment the plurality of drive assemblies includes four drive assemblies, distributed equally spaced apart around the drive rim of the main sprocket.

The frame may include first and second plates mounted above and below the belt so as to sandwich the endless belts of each drive assembly therebetween. The second plate may be shaped to correspond to the serpentine shape of the driven portions of the belts and to correspond to a shape of the belts along the corresponding spans and around the corresponding idler sprockets. Thus, when tension in the belts is relieved, the belts are removable from their corresponding pairs of idler sprockets and drive sprockets without removal of the second plate.

The at least two auxiliary sprockets may be mounted on one side of the first plate, and a plurality of motors may be mounted on the opposite side of the first plate, so as to be in direct driving alignment with a corresponding drive sprocket in each drive assembly. The plurality of drive assemblies and the plurality of motors are mounted around an outer circumference of the first plate, whereby ease of access is provided for replacement, maintenance and repair.

In one embodiment the drive rim has an annular array of cooling passages formed therein whereby the drive rim is cooled by the passage of air through the passages to thereby cool the belts. A source of forced air may be provided to cool the motors and to provide an airflow through the passages. The first plate and the main sprocket may form an air manifold therebetween and the source of forced air forces the airflow into the manifold.

BRIEF DESCRIPTION OF THE DRAWINGS

FIG. 9b is an enlarged view of a portion of FIG. 9a.

DETAILED DESCRIPTION OF EMBODIMENTS OF THE INVENTION

Figure 1:
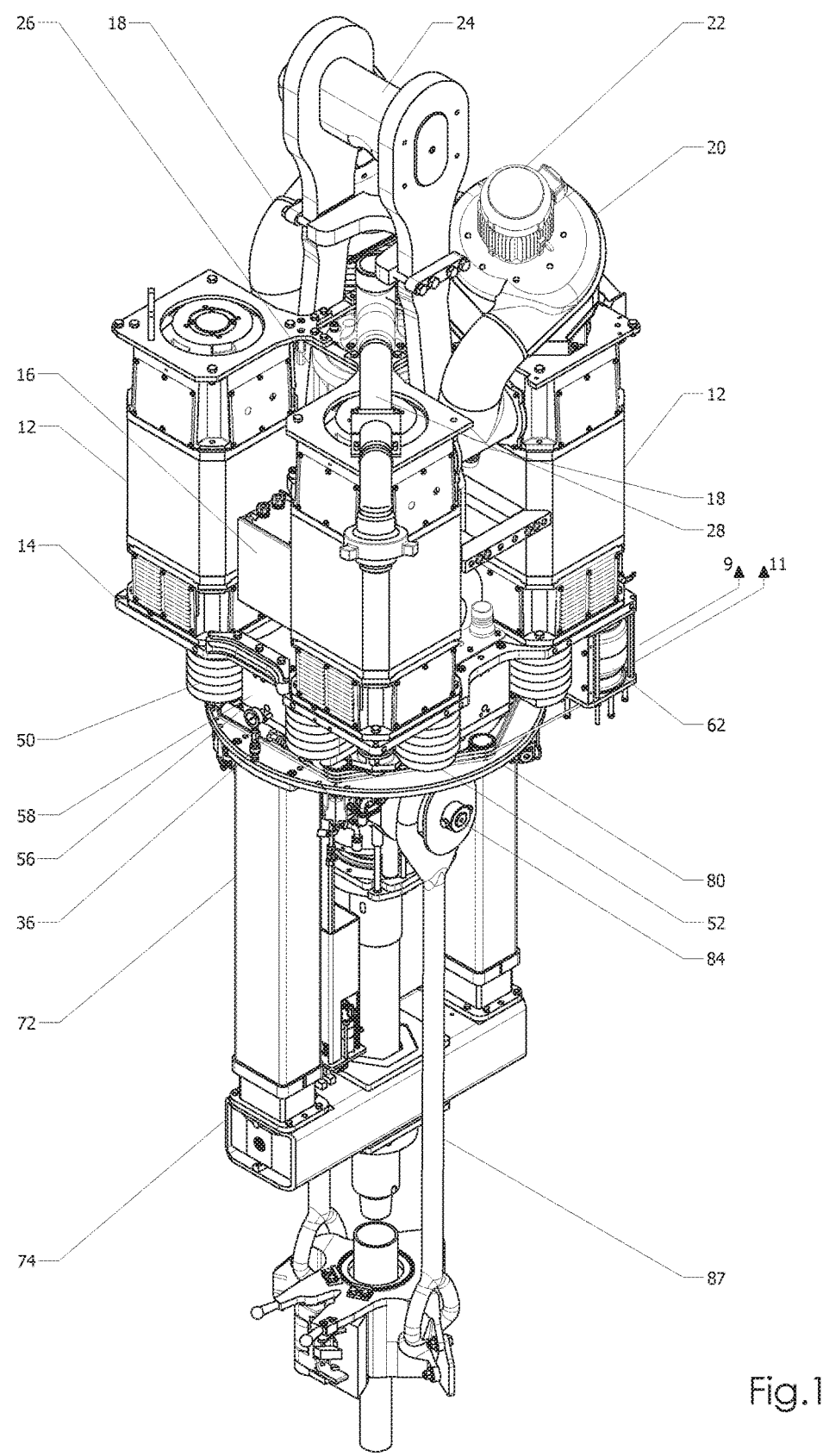
FIG. 1 is, in perspective view, a distributed drive for a top drive according to one embodiment of the present invention.
Figure 2:
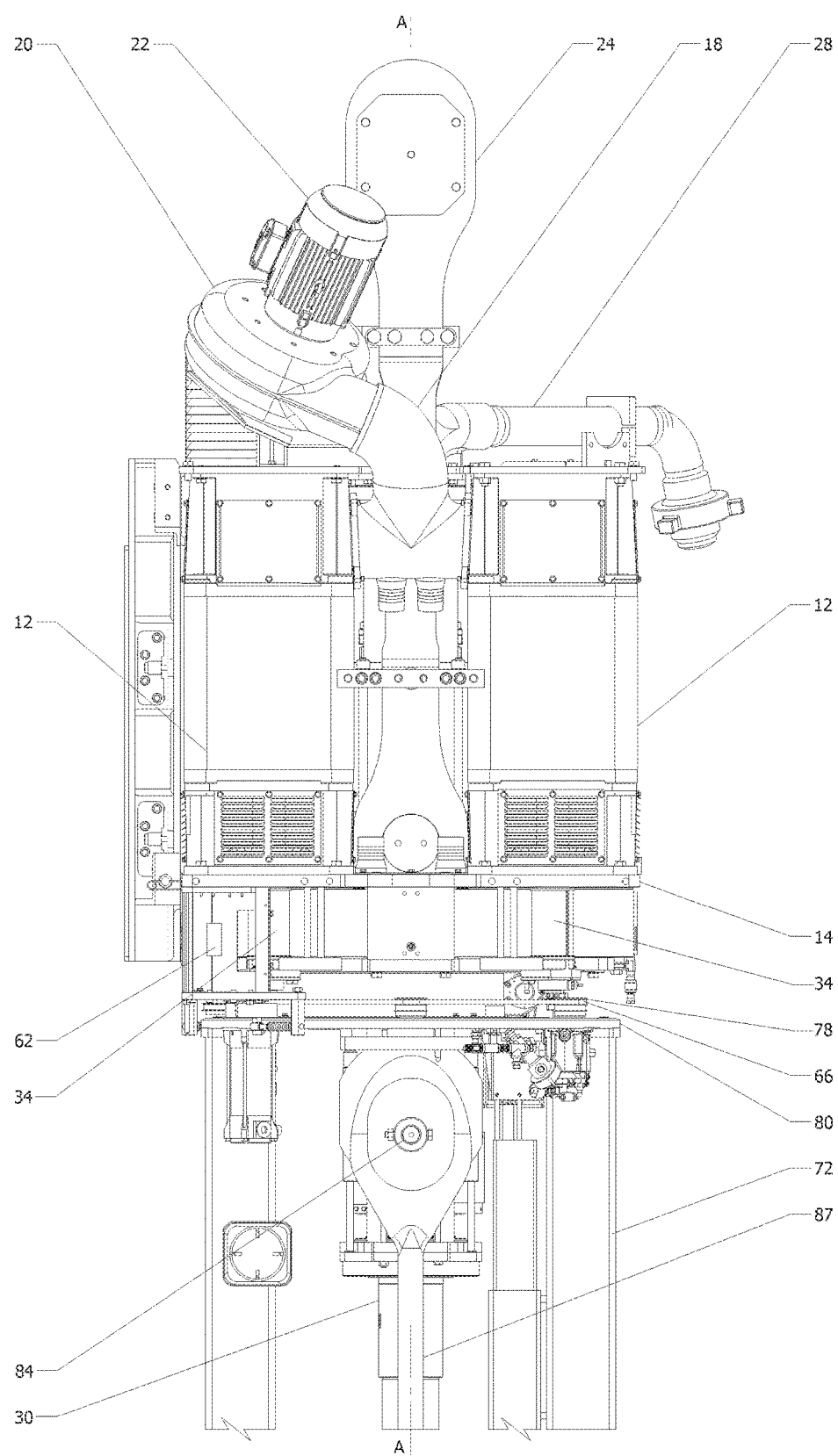
FIG. 2 is a section view along line 2 in FIG. 1.
Figure 3:
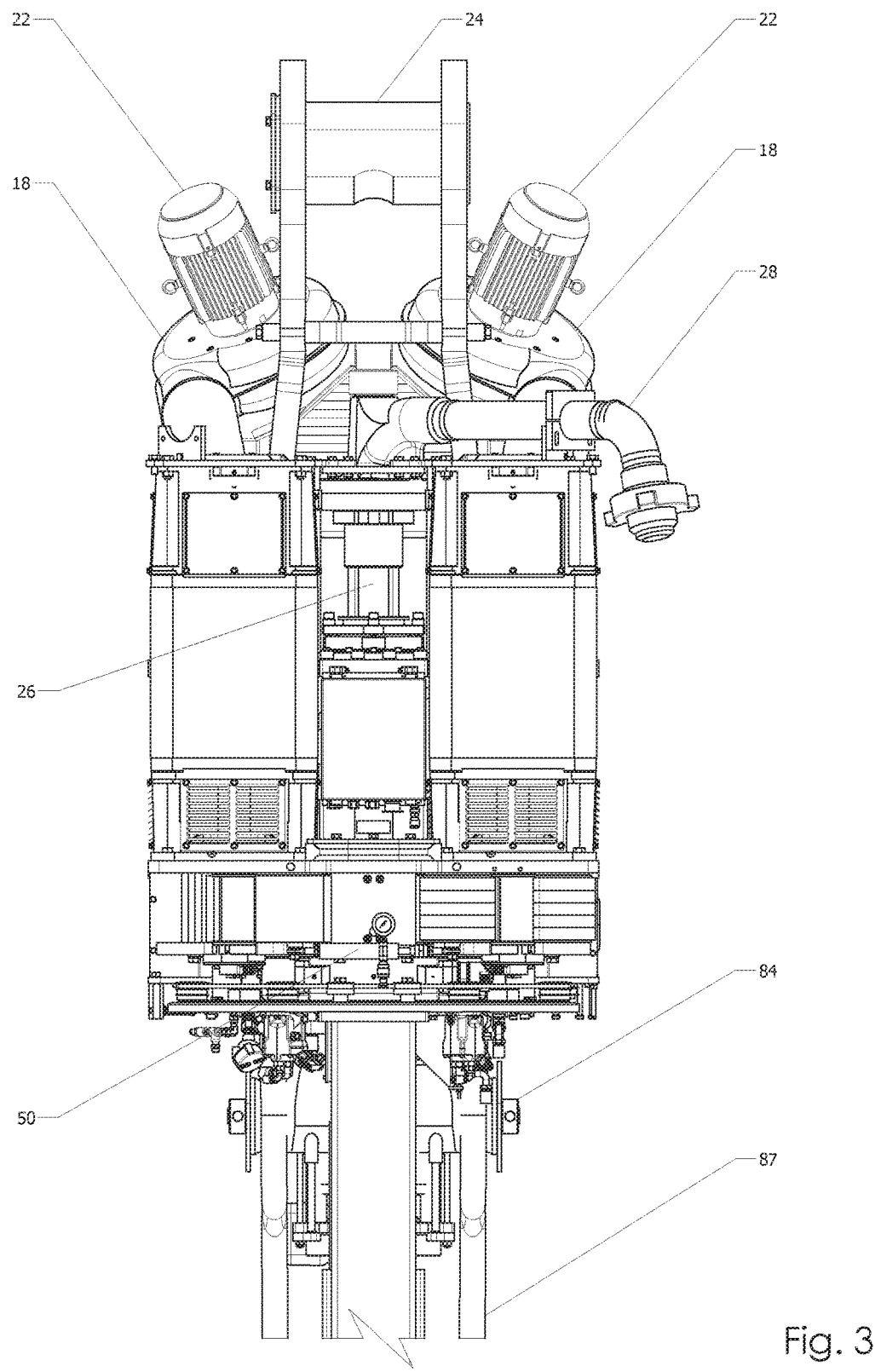
FIG. 3 is a rear view of the top drive of FIG. 1.
Figure 4:
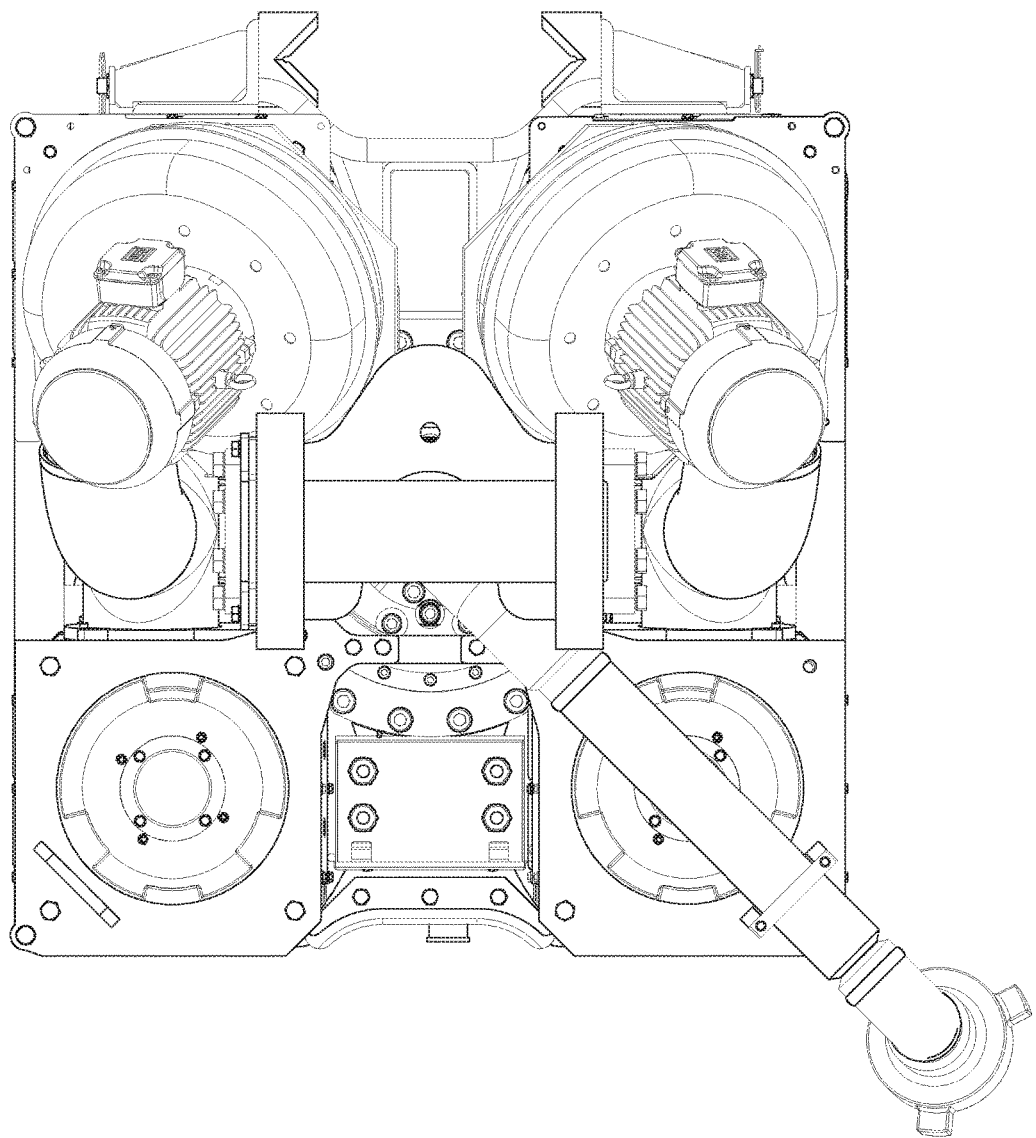
FIG. 4 is a plan view of the top drive of FIG. 1.
Figure 5:
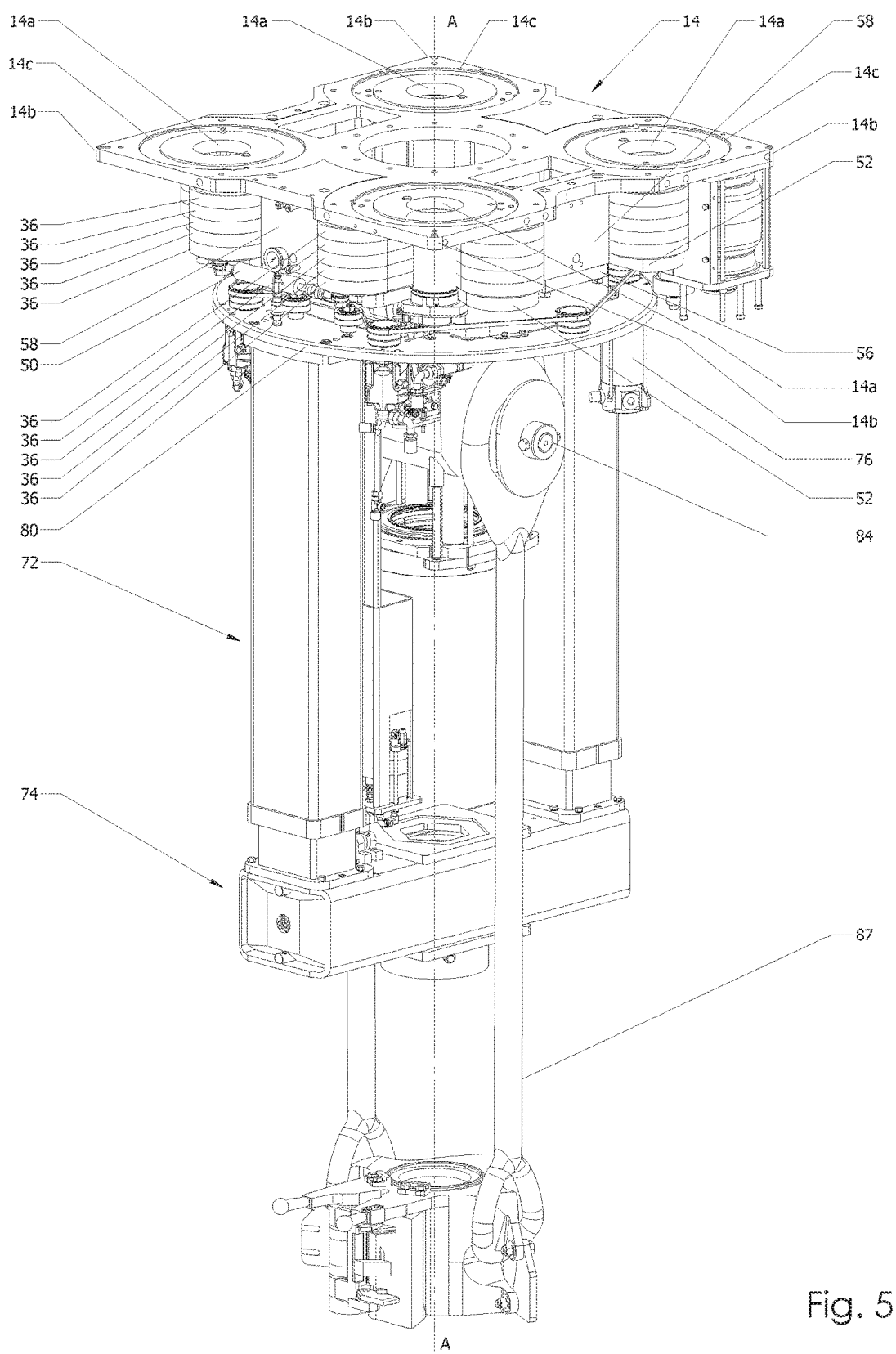
FIG. 5 is the perspective view of FIG. 1, partially cut away, to expose the drive plate.
Figure 6:
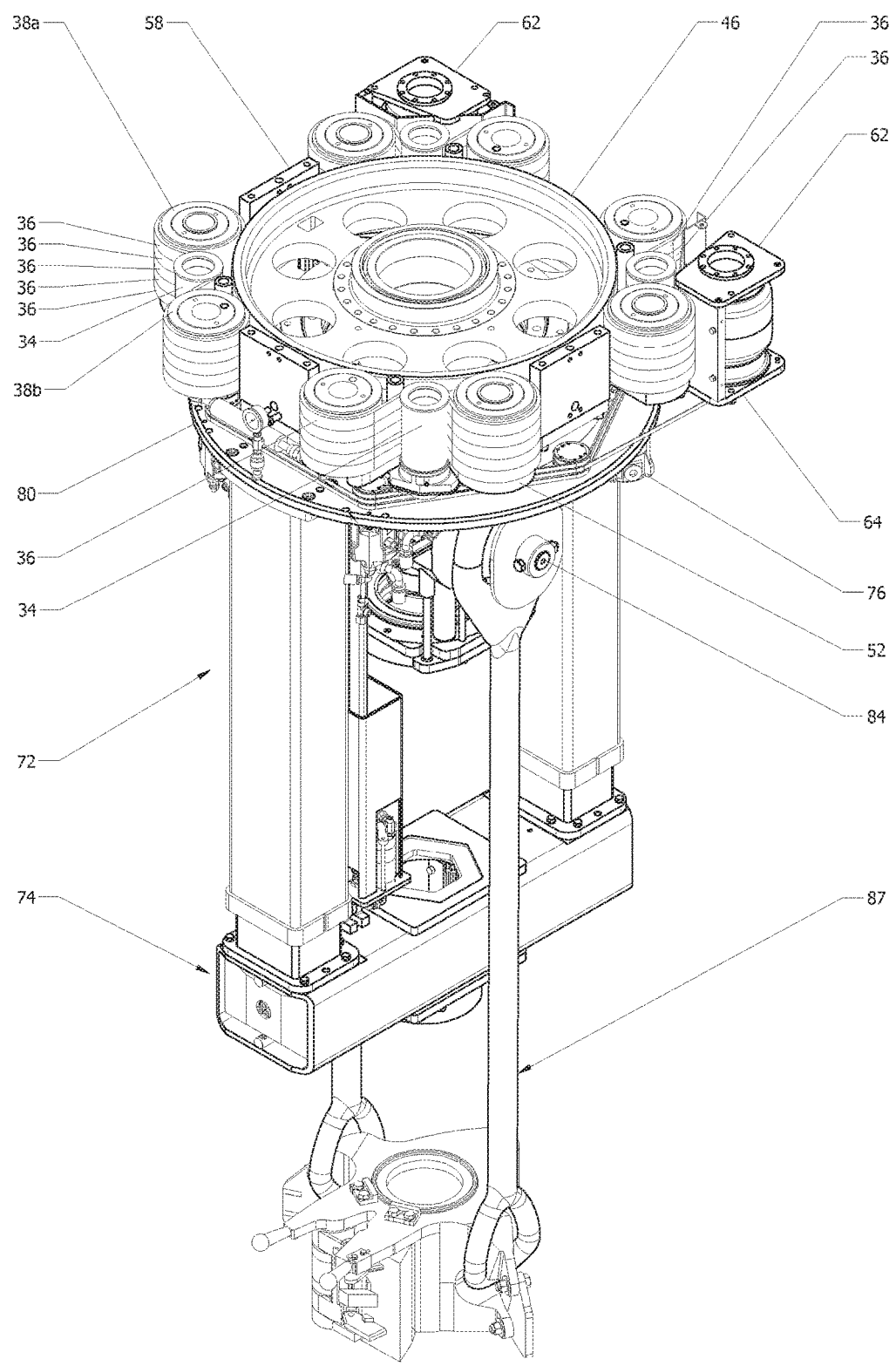
FIG. 6 is the view of FIG. 5 with the drive plate removed to show the distributed drive employing independent belted transmissions.
Figure 7:
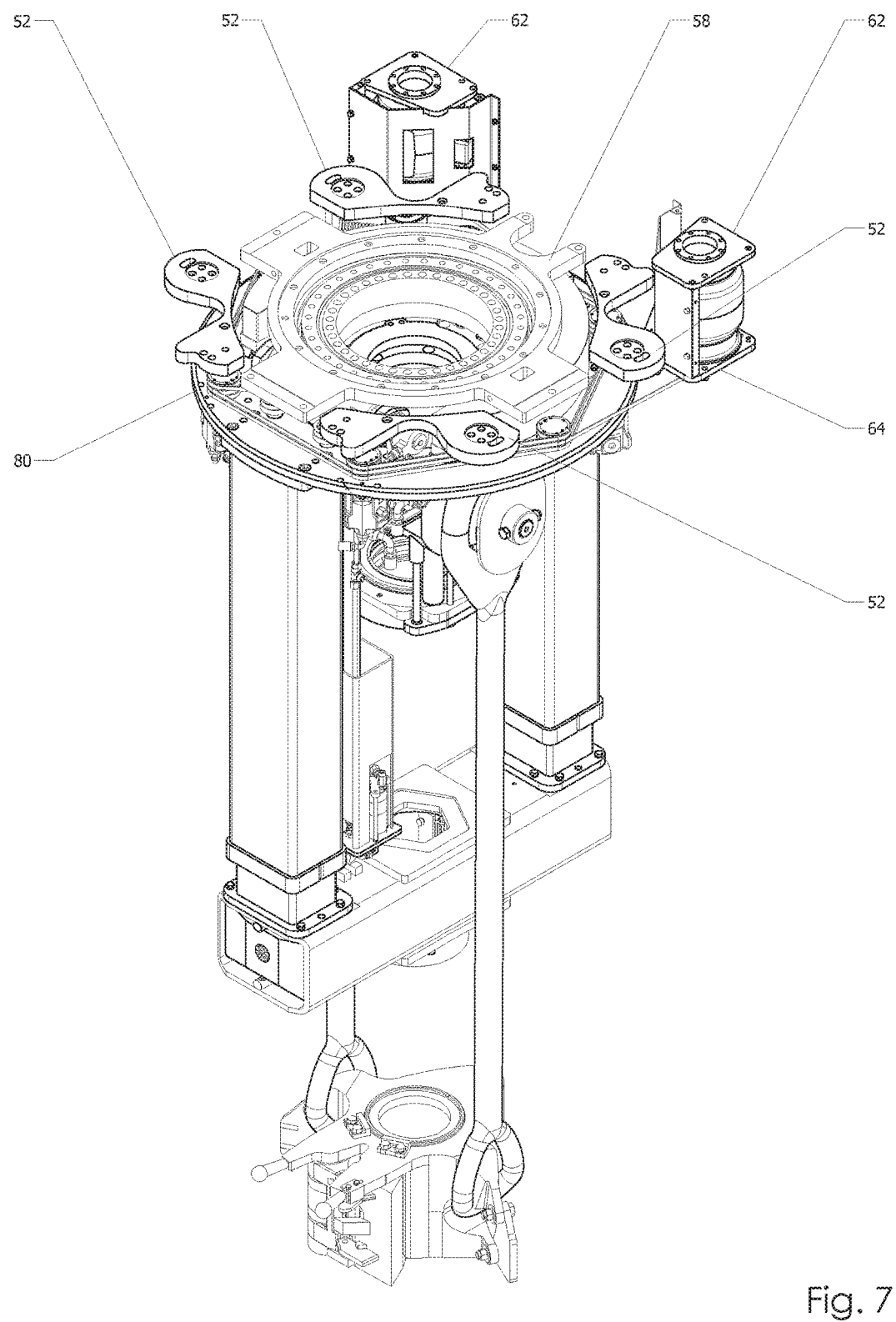
FIG. 7 is the view of FIG. 6 with the distributed drive cut away to expose the bottom plates covering the slewing swivel.

As seen in the accompanying Figures wherein like reference numerals denote corresponding parts in each view, the assembled top drive shown in FIG. 1 includes four modularly mounted variable frequency drive AC motors 12 mounted on a drive plate 14. Other types of motors, such as hydraulic, may be used. In one preferred embodiment, in order to provide balancing of the top drive about its centre or drive axis A, motors 12 mount in each of the four corners of plate 14 best seen in FIGS. 5 and 10. Advantageously, the motor housings surrounding each motor 12 mount snugly and conformally around the corresponding receiving pilot bores 14c of plate 14 so as to align the motor drive shafts 12a, seen in FIG. 9a, with a corresponding aperture 14a in plate 14, seen in FIG. 5. Thus the arrangement of motors 12 on plate 14 around axis A may be described as a plurality of electric motors spaced apart radially and equally about drive axis A so as to form, in conjunction with the associated belted transmissions described below, one embodiment of a distributed drive. As may be seen from the bolt hole pattern on plate 14, motors 12 may be simply bolted down onto plate 14 which provides for ease of external access for removal and installation in the event that for example one of motors 12 fails.

Motors 12 and plate 14 are sized relative to each other to provide open spaces between the motors into which may be mounted electrical junction boxes or other accessories. Also, the spaces or gaps between motors 12, which may in one embodiment be in the order of 12 inch wide gaps, provide for air ducting 18 which directs air from blowers 20, themselves driven by electric motors 22 so as to provide cooling air for motors 12. In a preferred embodiment, two blowers 20 are provided, each providing cooling air flow into the motor housings into a corresponding pair of motors 12 via corresponding ducting 18. A hoisting collar 24 is provided, which straddles the central drilling mud conduit 26. Drilling mud is provided to central conduit 26 via drilling mud supply pipes 28. Drilling mud is pumped through pipes 28 and down through central conduit 26 so as to exit downwardly from the internal bore of quill 30 along drive axis A.

Figure 9:
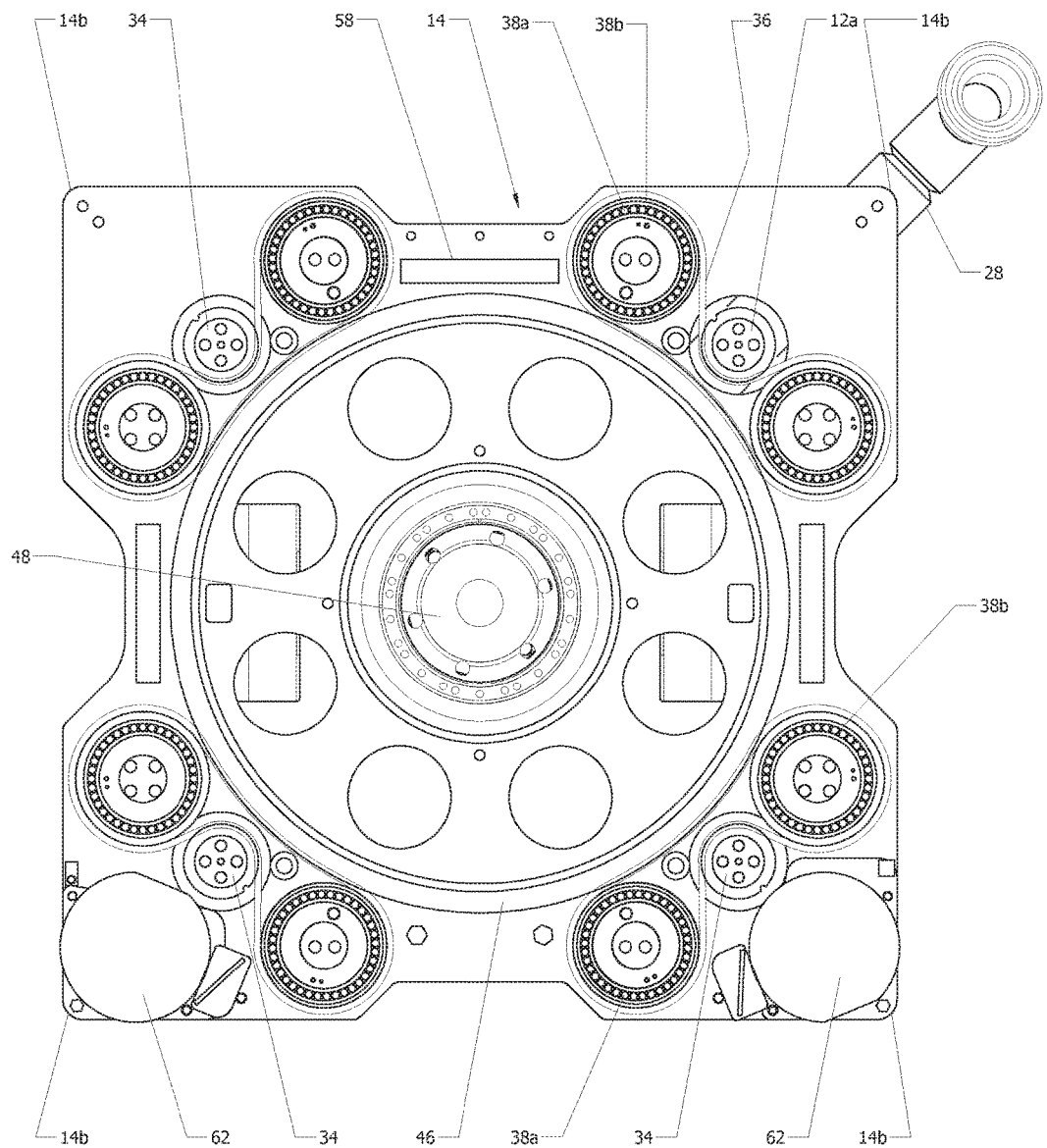
FIG. 9 is a bottom view looking up along line 9 in FIG. 1.
Figure 9A:
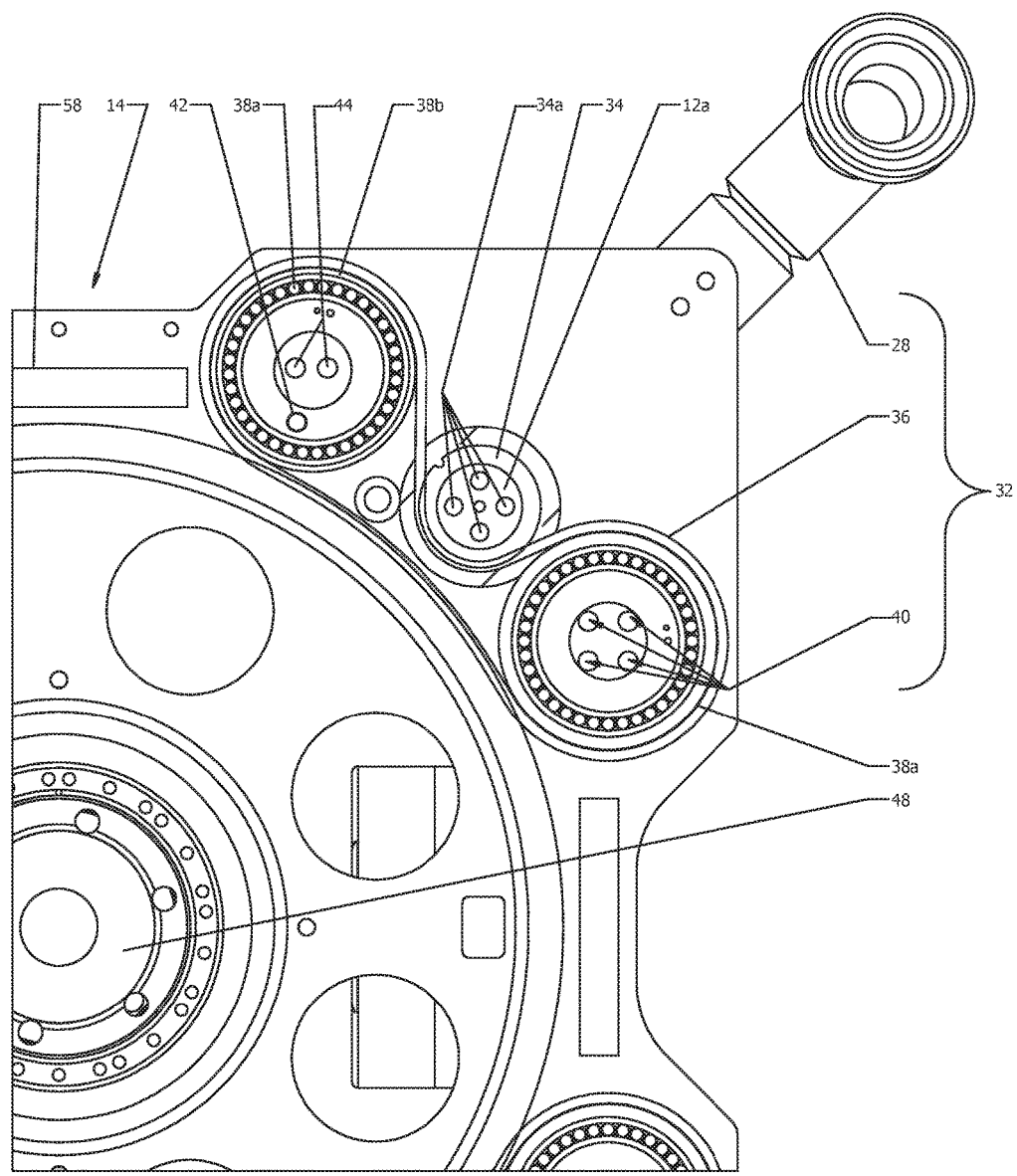
FIG. 9a is a partially cut away bottom view looking up at one belted transmission with the bottom plates removed to expose the engagement of the belts with the motor sprocket and bolt sprocket.
Figure 10:
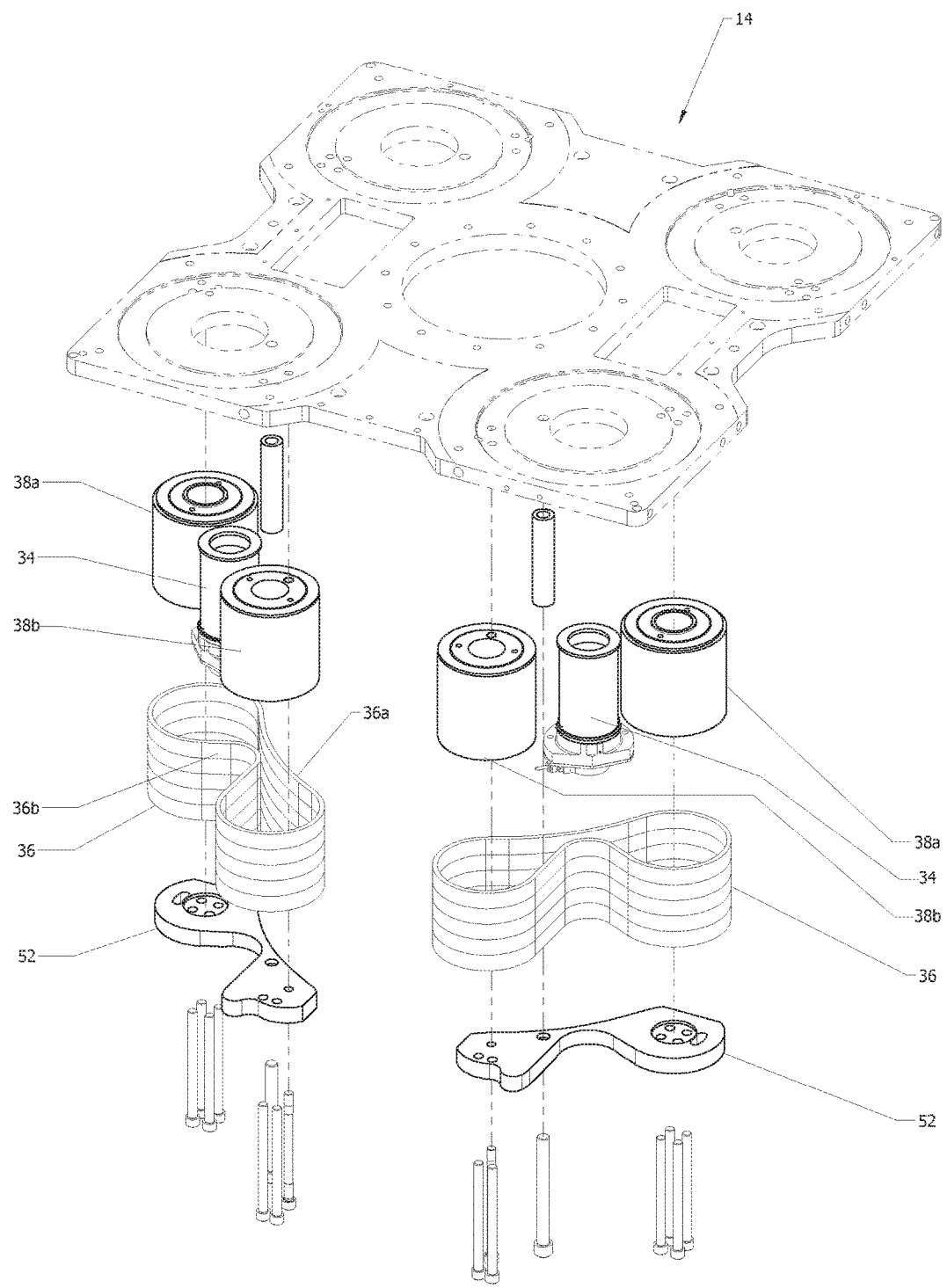
FIG. 10 is a partially cut away exploded view of the belts, idlers and associated bottom plates of two belted transmissions which mount up under the drive plate shown in dotted outline.

Each motor shaft 12a drives its own corresponding belted transmission as better seen in FIGS. 9, 9a and 10. One such belted transmission is shown in FIG. 9a and generally indicated at 32. It includes a motor sprocket 34, mounted on drive shaft 12a, driving a stack of toothed belts 36. Each belt 36 rounds idlers 38a and 38b mounted on bearings 39 and oppositely disposed on either side of sprocket 34. Sprocket 34 is mounted to drive shaft 12a using bolt holes 34a. Each idler 38a is mounted sandwiched between the underside of drive plate 14 for example by means of bolts using bolt hole pattern 40 and plates 52, best seen in FIG. 10. Idlers 38b may be mounted by means of an eccentric sandwiched between the underside of drive plate 14 for example by the use of idler eccentric pivot 42, and plates 52, whereby upon pivoting idler 38*b* about pivot 42 so as to tension belt 36, the position of idler 38*b* may be fixed to the underside of drive plate 14 by means of bolt holes 44. The plates 14 and 52 are held rigidly apart by rigid shafts 38*c* and 38*d*. As will be appreciated, the teeth (not shown) on the outside of belt 36 continue around the entire length of belt 36 so that the teeth engage against the corresponding teeth (not shown) on bull sprocket 46. Bull sprocket 46 is rigidly mounted to the top drive main shaft 48 whereby rotational power is delivered to quill 30 by the contribution of each of the four motors 12 and their corresponding independent belted transmissions 32.

In one embodiment, although this is not intended to be limiting, the stack of tooth belts 36 includes a closely adjacent vertically stacked stack of five such belts 36. The reason that number of belts are stacked one on top of the other is merely that such belts are conventionally supplied with the teeth to the inside of the belt, and so with the relatively stiff, for example carbon fibres impregnated, belts used to convey the considerable power generated by each motor 12 so as to impart that power to bull sprocket 46, it can be difficult to invert each belt 36 so as to dispose that belt's teeth outwardly. The narrower the belt, the easier it is to invert the belt so as to outwardly expose the teeth. It may be that a single monolithic belt may be employed, for example if manufactured with the teeth outwardly disposed. Thus in the example illustrated, each belt may be described as having 14 mm pitch, with dimensions of 37 mm by 1640 mm. Advantageously belts 36 engage for example 18 teeth on bull sprocket 46 and extend for example 120 degrees, or one third of the way around the drive sprocket.

Figure 10A:
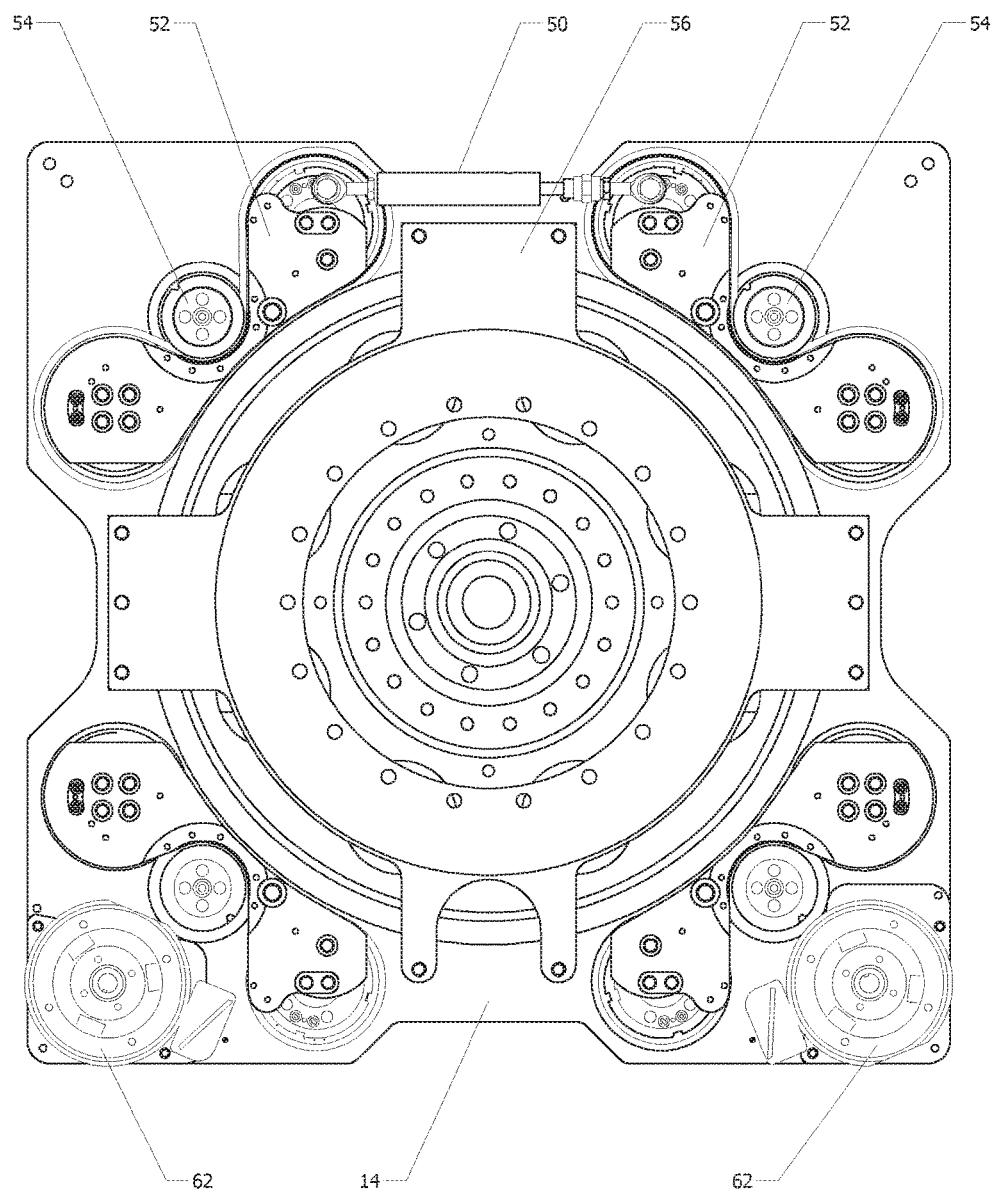
FIG. 10a is the bottom view of FIG. 9 with the bottom plates and motor sprocket end caps installed.
Figure 11:
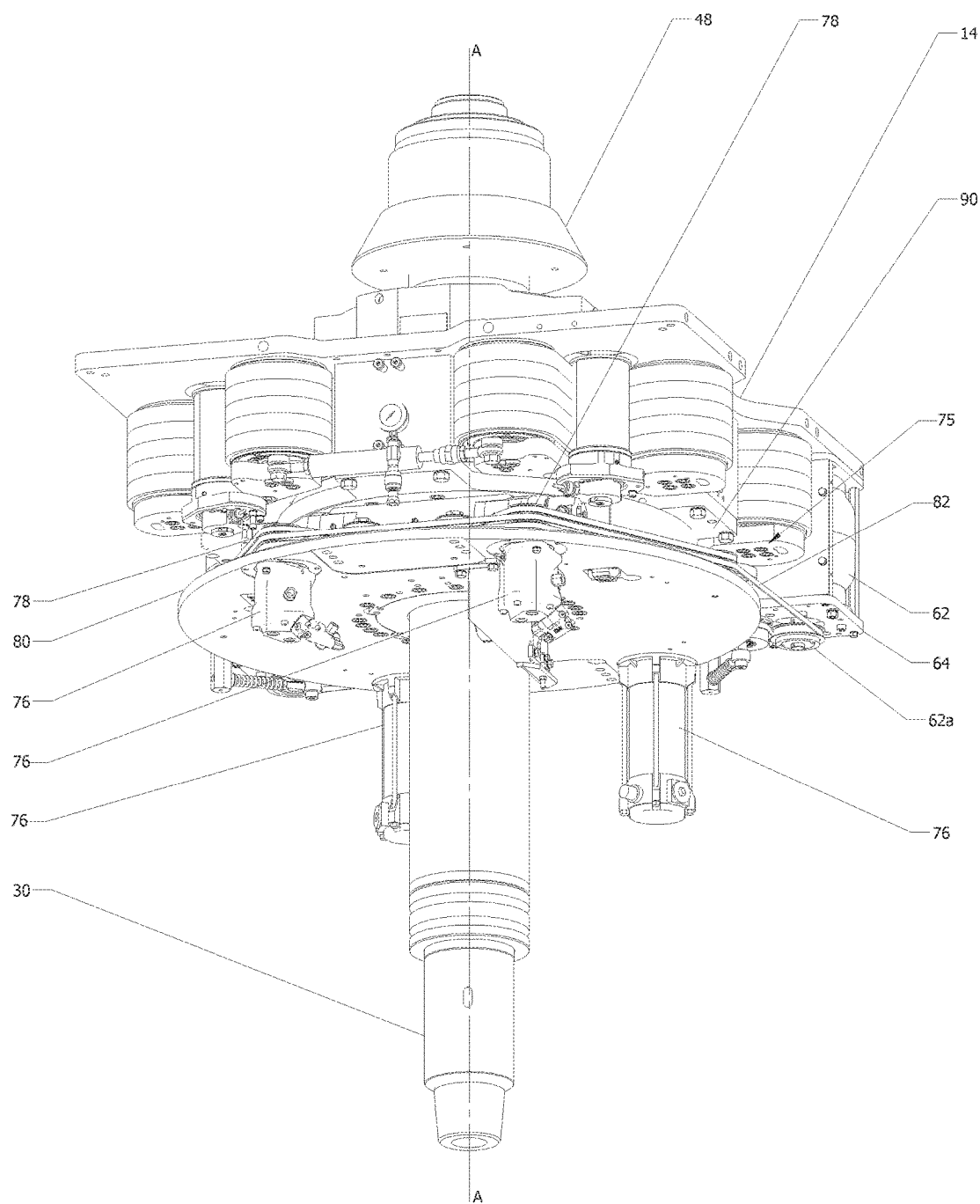
FIG. 11 is a bottom perspective view showing the main shaft and quill mounted in the top drive of FIG. 5 with the elevator, wrench and wrench frame removed.

Identical belted transmissions 32 are mounted under each corner 14*b* of drive plate 14. Extension tool 50, best seen in FIGS. 10*a* and 11, is an example of a tool which is used to pivot idler 38*b* about pivot 42 so as to tension belt 36. Once the tension is set and the eccentric anchored to drive plate 44, tool 50 is removed, and the process repeated at each corner 14*b* for each belted transmission 32 which have had belts changed or during setup or periodically to take up slack due to belt wear or stretching. Belts 36 are held in place on idlers 38*a* and 38*b* by means of bottom plates 52 nested against flanged end cap 54 mounted over motor sprockets 34. A bottom plate 56 is mounted substantially in the plane containing bottom plates 52, and is mounted rigidly to drive-plate 14 by means of rigid spacing columns 58. Cover plates 60 are mounted up under corners 14*b* of plate 14 so as to enclose belts 36.

Figure 8:
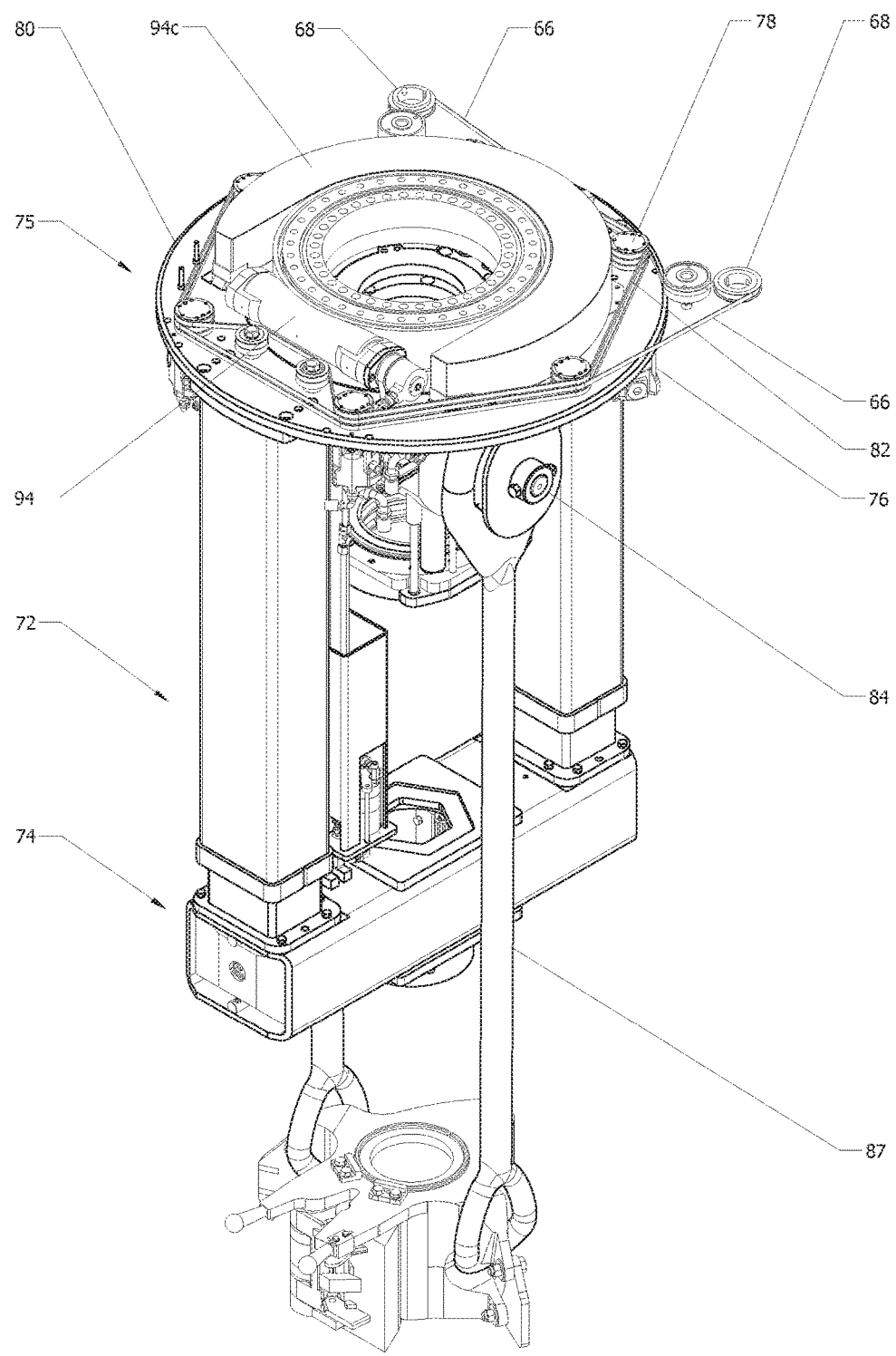
FIG. 8 is the view of FIG. 7 with the bottom plates cut away to expose the slewing swivel, the wrench support and the rotating power transmission for the slew actuators.

The slewing swivel 70, wrench frame 72 and wrench 74, the rotating power transmission 75, and the balance of the other components illustrated and referenced by number in FIGS. 8 and 11 are the subject of commonly assigned co-pending U.S. patent application No. 61/555,950 entitled Top Drive with Slewing Power Transmission which is incorporated herein by reference but forms no part of the invention which is the subject of the present specification. The exception to this incorporation by reference is that in FIG. 8 elevator links 87 have been included and the link tilt 86 has been removed from the view.

With reference to FIG. 10, endless belts 36, which may be a single monolithic belt or a stack of individual belts, have a span portion 36*a*, also referred to herein merely as the span, and a driven portion 36*b*. Although not shown with teeth, as described herein, in one embodiment belts 36 and the sprockets engaged by belts 36 include teeth. As would be known to one skilled in the art it is conventional to refer to the pitch circle as a reference. Thus span 36*a* may be understood as engaging the corresponding sprockets 38*a* and 38*b* along the corresponding sprocket pitch circles, and as engaging the main or bull sprocket 46 along the corresponding main sprocket pitch circle. The span thus engages the main sprocket along a primary arc of contact sufficient to drive the main sprocket in conjunction with the other drive assemblies while minimizing risk of slippage of the belts, breakage of teeth, etc.

Figure 9B:
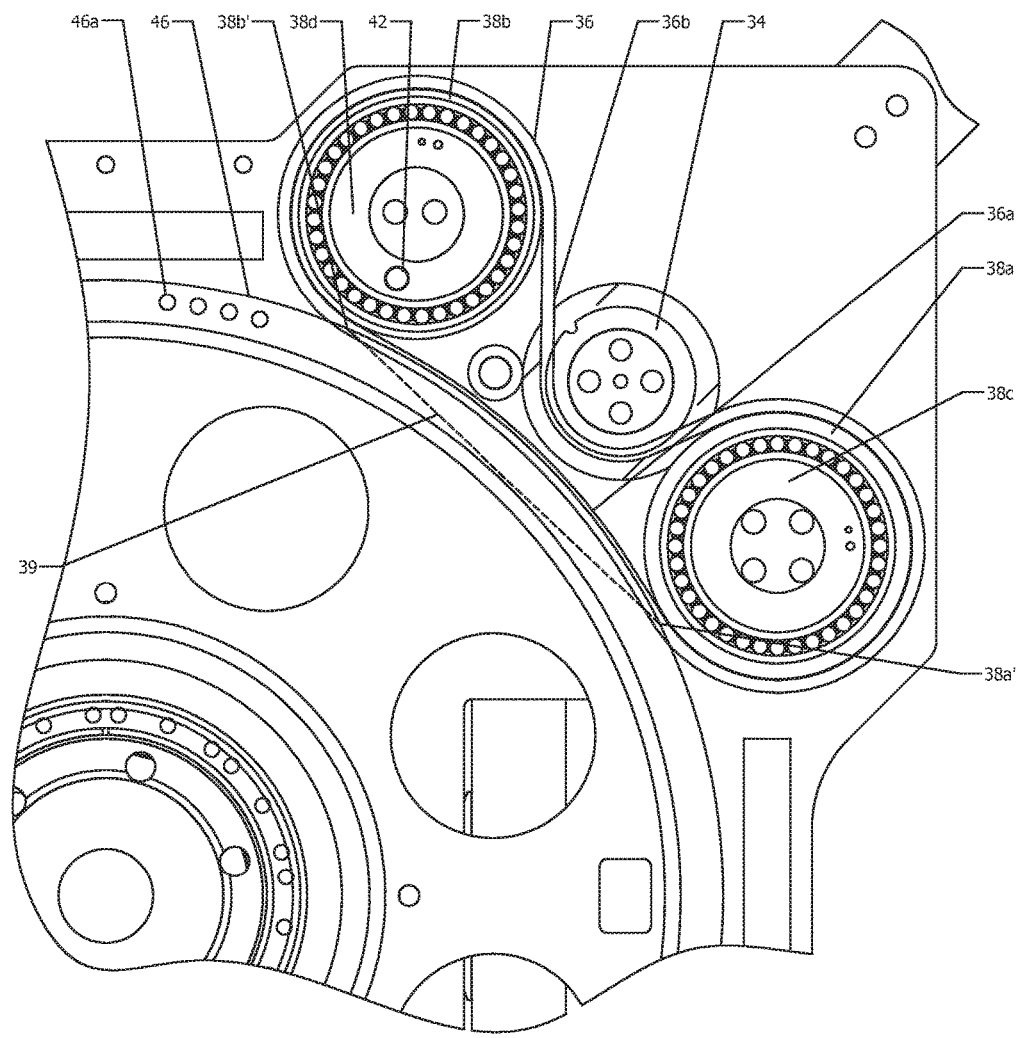

A secondary arc of contact is where driven portion 36*b* wraps around drive or motor sprocket 34. This secondary arc of contact may extend substantially one quarter or more according of the circumference of sprocket 34 to the above discussion of what is appropriate for a particular belt and sprocket arrangement. Thus as seen in FIG. 9*b*, which is merely an enlargement of FIG. 9*a*, belts 36 form a serpentine shape around the driven portion 36*b* and a bowed shape along span 36*a*. Span 36*a* is bowed in the sense that it follows around main sprocket 46 between two notional tangents where the pitch circles of sprockets 38*a* and 38*b* are tangent to the pitch circle of main sprocket 46. The span extends between these pair of tangents 38*a*' and 38*b*', bowed relative to a chord or line 39 therebetween.

In one embodiment, main sprocket may be cooled by a forced air flow which flows through apertures 46*a*, only a few of which are illustrated in FIG. 9*b* but which would extend as an array of apertures around the circumference of sprocket 46. This cooling would also serve to cool belts 36.

As used herein, and as would be understood by one skilled in the art, the illustrations of belts and sprockets shown herein are not intended to be limiting as other forms of belts and sprockets would work. Thus as used herein a belt such as belt 36 is any endless flexible member providing or transmitting a driving force from a driven sprocket within the drive assembly, to a main or bull sprocket which itself then drives rotation of a main shaft or the like. Also, as used herein, the term sprocket is not intended to be limiting, and is meant to include other rotating members for example pulleys, as would be known to one skilled in the art.

What is claimed is:

1. A high-torque drive comprising:
    a rotatable main sprocket comprising a circumferential drive rim;
    a plurality of drive assemblies circumferentially spaced apart around the drive rim of the main sprocket, each of the drive assemblies comprising:
        a drive belt having an exterior surface guided by a plurality of auxiliary sprockets to follow an endless loop having a span between a first one of the auxiliary sprockets and a second one of the auxiliary sprockets which contacts a corresponding arcuate portion of the drive rim in an arc of contact; and
        a drive motor connected to drive the belt by way of a driving one of the auxiliary sprockets;
    wherein in each of the plurality of drive assemblies the drive belt is one of a plurality of belts, the belts of the plurality of belts stacked in a direction parallel to an axis of rotation of the main sprocket such that each of the plurality of belts has a span between the first one of the auxiliary sprockets and the second one of the auxiliary sprockets and contacts the drive rim in a corresponding arc of contact between the first and second auxiliary sprockets.

2. A drive according to claim 1 wherein the exterior surface of each of the belts is toothed and engages teeth on the drive rim of the main sprocket.

3. A drive according to claim 2 wherein the driving one of the auxiliary sprockets engages the exterior surfaces of the belts.

4. A drive according to claim 1 wherein the first and second auxiliary sprockets are angularly spaced apart around the circumference of the main sprocket and the arc of contact of the belt with the main sprocket follows the main sprocket between two points where tangents to pitch circles of the first and second sprockets respectively are tangent to a pitch circle of the main sprocket.

5. A drive according to claim 1 wherein the belt comprises carbon fibres.

6. A drive according to claim 1 wherein the belt comprises a dry run belt.

7. A drive according to claim 1 wherein a pitch of the teeth on the belt is 14 mm.

8. A drive according to claim 1 wherein the belt engages 18 teeth on the drive rim of the main sprocket.

9. A drive according to claim 1 wherein the arcs of contact of the belts of the drive assemblies collectively extend around more than ⅓ of the circumference of the drive rim of the main sprocket.

10. A drive according to claim 1 wherein the auxiliary sprockets of each of the drive assemblies are located between two parallel spaced apart plates, the drive motor is connected to directly drive the driving one of the auxiliary sprockets and the drive motor and the driving one of the auxiliary sprockets are on opposite sides of one of the plates.

11. A drive according to claim 8 wherein the belt wraps at least ¼ or more of the circumference of the driving one of the auxiliary sprockets.

12. A drive according to claim 1 comprising an eccentric tensioner associated with one of the first and second auxiliary sprockets.

13. A top drive for drilling comprising a drive according to claim 1 wherein the main sprocket directly drives a main shaft coupled to a quill of the top drive.

14. A top drive according to claim 13 comprising a mud conduit extending longitudinally through the main shaft.

15. A top drive according to claim 13 wherein the drive motor of each of the drive assemblies comprises a variable frequency drive AC motor.

* * * * *